United States Patent
Choi et al.

(10) Patent No.: US 12,515,546 B2
(45) Date of Patent: Jan. 6, 2026

(54) POWER CONVERSION DEVICE FOR ELECTRIC VEHICLES AND OPERATION METHOD THEREOF

(71) Applicants: Hyundai Motor Company, Seoul (KR); Kia Corporation, Seoul (KR)

(72) Inventors: Min Seong Choi, Hwaseong-si (KR); Sun Ho Lee, Uiwang-si (KR); Hyun-Wook Seong, Anyang-si (KR); Dong Gyun Woo, Hwaseong-si (KR)

(73) Assignees: Hyundai Motor Company, South (KR); Kia Corporation, South (KR)

( * ) Notice: Subject to any disclaimer, the term of this patent is extended or adjusted under 35 U.S.C. 154(b) by 0 days.

(21) Appl. No.: 18/505,230

(22) Filed: Nov. 9, 2023

(65) Prior Publication Data

US 2025/0042279 A1   Feb. 6, 2025

(30) Foreign Application Priority Data

Aug. 4, 2023   (KR) .......................... 10-2023-0102184

(51) Int. Cl.
- *H02J 7/06* (2006.01)
- *B60L 53/22* (2019.01)
- *H02M 1/42* (2007.01)
- *H02M 7/217* (2006.01)

(52) U.S. Cl.
CPC .............. *B60L 53/22* (2019.02); *H02M 1/42* (2013.01); *H02M 7/217* (2013.01)

(58) Field of Classification Search
CPC .......... B60L 53/22; H02M 1/42; H02M 7/217
See application file for complete search history.

(56) References Cited

U.S. PATENT DOCUMENTS

| | | | |
|---|---|---|---|
| 5,977,658 A * | 11/1999 | Hoole | H02M 5/02 307/29 |
| 11,926,229 B2 * | 3/2024 | Minamii | H02J 7/345 |
| 2020/0195037 A1 * | 6/2020 | Woo | B60L 53/14 |
| 2020/0361323 A1 * | 11/2020 | Chon | H02M 7/44 |
| 2021/0376741 A1 * | 12/2021 | Escudero Rodriguez | H02M 3/33573 |
| 2022/0410740 A1 * | 12/2022 | Jun | B60L 53/22 |

* cited by examiner

*Primary Examiner* — Rexford N Barnie
*Assistant Examiner* — Esayas G Yeshaw
(74) *Attorney, Agent, or Firm* — Slater Matsil, LLP

(57) ABSTRACT

An embodiment power conversion device for electric vehicles includes a battery, a relay circuit connected to a charging/discharging outlet through first power lines, a power factor correction circuit connected to the relay circuit through second power lines between the relay circuit and the battery, a discharging outlet connected to branch lines branched from each of the second power lines, and a controller configured to control the relay circuit and the power factor correction circuit such that power from the battery is supplied to a load using asymmetric power or to a load using symmetric power connected to the discharging outlet.

13 Claims, 7 Drawing Sheets

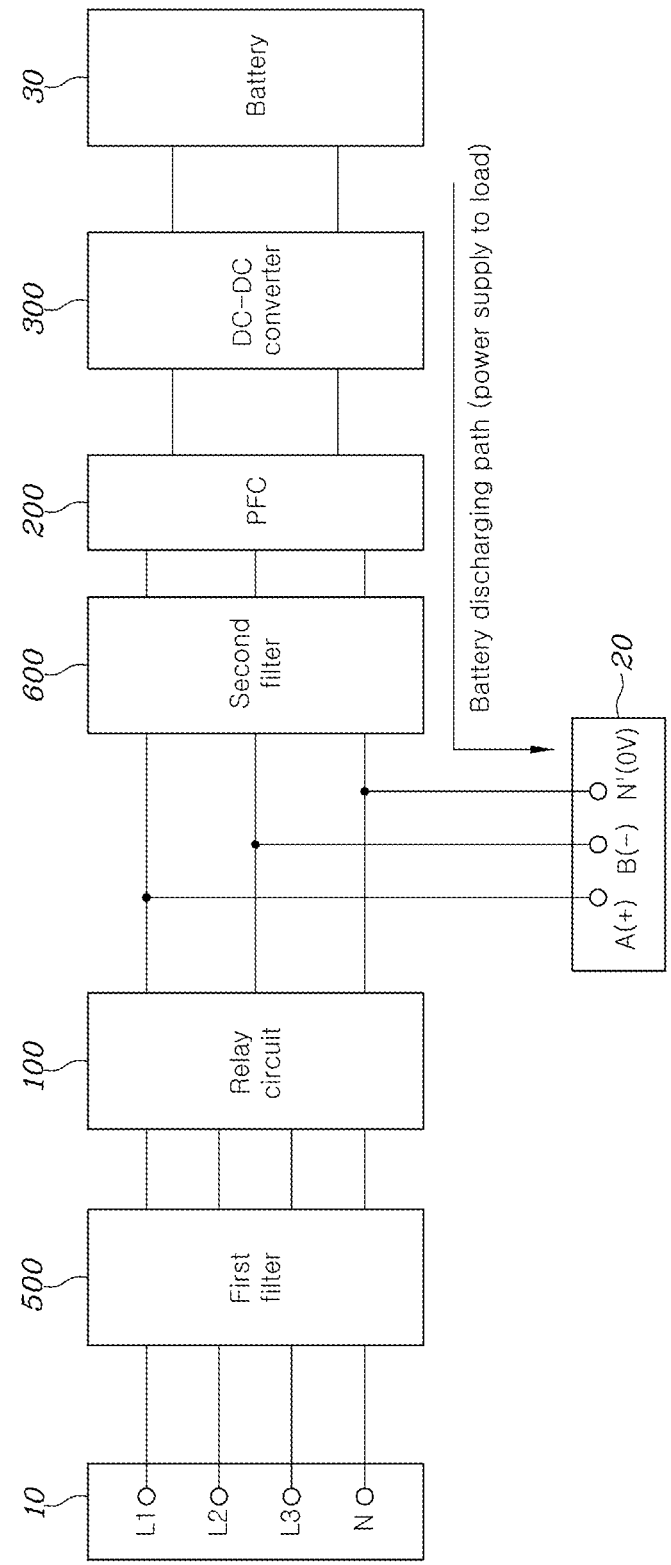

POWER CONVERSION DEVICE FOR ELECTRIC VEHICLES AND OPERATION METHOD THEREOF

CROSS-REFERENCE TO RELATED APPLICATIONS

This application claims the benefit of Korean Patent Application No. 10-2023-0102184, filed on Aug. 4, 2023, which application is hereby incorporated herein by reference.

TECHNICAL FIELD

The present invention relates to a power conversion device for electric vehicles and an operation method thereof.

BACKGROUND

In order to drive an electric vehicle (EV), an on-board charger (OBC) for charging a high-voltage battery using commercial AC power is provided in the electric vehicle.

In general, the OBC includes a power factor correction circuit (PFC) that corrects the power factor of commercial AC power and a DC-DC converter that converts the power into a voltage required by the high-voltage battery.

Recently, development of Vehicle-to-Grid (V2G) or Vehicle-to-Load (V2L) technology for supplying the energy stored in a high-voltage battery provided in an electric vehicle to a system or an electric load is required.

Accordingly, it is required that electric vehicles be provided with circuits for various power conversions, such as circuits for realizing V2G or V2L, as well as chargers for simply charging batteries.

In addition, different types of commercial AC power are used in countries (for example, Europe: (three-phase) 230 VAC/50 Hz, North America: (single-phase) 240 VAC/60 Hz, Korea: (single-phase) 220 VAC/60 Hz, etc.), and symmetric power (North America 240 VAC) and asymmetric power (Korea/Europe/North America 120 VAC) are used even in the case of a V2L outlet, and thus a power conversion circuit that can be commonly applied to various types of power and outlets is required.

Demand for electric vehicles is increasing, and in a case in which various power conversion circuits are individually provided in an electric vehicle in order to satisfy various demands, a large number of electrical components is required to implement the respective power conversion circuits, and thus problems that a circuit structure become complicated and the cost for implementing the circuit increases may occur.

This background art is technical information that the inventor possessed for derivation of embodiments of the present invention or acquired during the process of deriving embodiments of the present invention, and cannot necessarily be regarded as known art disclosed to the general public prior to filing the application.

SUMMARY

The present invention relates to a power conversion device for electric vehicles and an operation method thereof. Particular embodiments relate to a power conversion device for electric vehicles capable of supplying power to loads using different types of power and an operation method thereof.

Embodiments disclosed have been made in response to the above-mentioned requirements, and embodiments of the present invention provide a power conversion device for electric vehicles capable of supplying power to loads using different types of power and an operation method thereof.

Furthermore, embodiments of the present invention provide a power conversion device for electric vehicles capable of realizing power conversion for supplying power to symmetric power outlets and asymmetric power outlets for each country using a minimum number of electrical components and an operation method thereof.

The technical objects of embodiments of the present invention are not limited to the above-mentioned matters, and from the following description, those of ordinary skill in the art to which the present invention belongs will be able to clearly understand other objects intended by the embodiments of the present invention.

As a technical means for achieving the above-described objects, a power conversion device for electric vehicles capable of supplying power to loads using different types of power and an operation method thereof can be provided.

In accordance with embodiments of the present invention, the above and other objects can be accomplished by the provision of a power conversion device for electric vehicles including a battery, a relay circuit connected to a charging/discharging outlet through first power lines, a power factor correction circuit connected to the relay circuit through second power lines between the relay circuit and the battery, a discharging outlet connected to branch lines branched from each of the second power lines, and a controller configured to control the relay circuit and the power factor correction circuit such that power from the battery is supplied to a load using asymmetric power or to a load using symmetric power connected to the discharging outlet.

According to an embodiment, the second power lines may include (2-1)-th to (2-3)-th power lines, and the branch lines may include first to third branch lines respectively connected to the (2-1)-th to (2-3)-th power lines.

According to an embodiment, the discharging outlet may include a positive (+) terminal connected to the first branch line, a negative (−) terminal connected to the second branch line, and a neutral terminal connected to the third branch line.

According to an embodiment, a positive (+) voltage may be supplied to the (2-1)-th power line, a negative (−) voltage may be supplied to the (2-2)-th power line, and a zero voltage may be supplied to the (2-3)-th power line.

According to an embodiment, the load using asymmetric power may be connected to the positive (+) terminal and the neutral terminal.

According to an embodiment, the load using asymmetric power may be connected to the negative (−) terminal and the neutral terminal.

According to an embodiment, the load using symmetric power may be connected to the positive (+) terminal, the negative (−) terminal, and the neutral terminal.

According to an embodiment, the relay circuit may include an L1 relay connected to the (2-1)-th power line, an L1-L2 relay and an L2 relay connected in parallel to the (2-2)-th power line, and an L3 relay and a neutral point relay connected in parallel to the (2-3)-th power line.

According to an embodiment, the power factor correction circuit may include a first leg connected to the (2-1)-th power line, a second leg connected to the (2-2)-th power line, and a third leg connected to the (2-3)-th power line.

According to an embodiment, when the load using asymmetric power is connected to the discharging outlet, the controller may turn off the L1 relay, the L1-L2 relay, the L2 relay, the L3 relay, and the neutral point relay and control the first to third legs such that a positive (+) voltage is supplied to the (2-1)-th power line or a negative (−) voltage is supplied to the (2-2)-th power line.

According to an embodiment, when the load using asymmetric power is connected to the discharging outlet, the controller may turn on the L1 relay, the L1-L2 relay, and the neutral point relay, turn off the L2 relay and the L3 relay, and control the first to third legs such that a positive (+) voltage is supplied to the (2-1)-th power line or a negative (−) voltage is supplied to the (2-2)-th power line.

According to an embodiment, the charging/discharging outlet may include an L1 terminal connected to the L1 relay and the L1-L2 relay through a (1-1)-th power line and a neutral terminal connected to the neutral point relay through a (1-2)-th power line, and when a vehicle exterior load is connected to the L1 terminal and the neutral terminal, the positive (+) voltage supplied to the (2-1)-th power line may be supplied to the L1 terminal or the negative (−) voltage supplied to the (2-2)-th power line may be supplied to the L1 terminal, and thus power may be simultaneously supplied to the load using asymmetric power and the vehicle exterior load.

According to an embodiment, when the load using symmetric power is connected to the discharging outlet, the controller may turn off the L1 relay, the L1-L2 relay, the L2 relay, the L3 relay, and the neutral point relay and perform PWM control on the first to third legs such that a positive (+) voltage is supplied to the (2-1)-th power line, a negative (−) voltage is supplied to the (2-2)-th power line, and a zero voltage is supplied to the (2-3)-th power line.

According to an embodiment, when the load using symmetric power is connected to the discharging outlet, the controller may turn on the L1 relay and the neutral point relay, turn off the L1-L2 relay, the L2 relay, and the L3 relay, and perform PWM control on the first to third legs such that a positive (+) voltage is supplied to the (2-1)-th power line, a negative (−) voltage is supplied to the (2-2)-th power line, and a zero voltage is supplied to the (2-3)-th power line.

According to an embodiment, the charging/discharging outlet may include an L1 terminal connected to the L1 relay and the L1-L2 relay through the (1-1)-th power line and a neutral terminal connected to the neutral point relay through the (1-2)-th power line, and when a vehicle exterior load is connected to the L1 terminal and the neutral terminal, the positive (+) voltage supplied to the (2-1)-th power line may be supplied to the L1 terminal and the zero voltage supplied to the (2-3)-th power line may be supplied to the neutral terminal, and thus power may be simultaneously supplied to the load using symmetric power and the vehicle exterior load.

In accordance with another embodiment of the present invention, there is provided a method of operating a power conversion device for electric vehicles, the method including detecting whether a vehicle exterior load is connected to a charging/discharging outlet or whether a vehicle interior load is connected to a discharging outlet, determining whether the vehicle interior load is a load using asymmetric power or a load using symmetric power when the vehicle interior load is connected to the discharging outlet, supplying asymmetric power to the load using asymmetric power based on power of a battery when the vehicle interior load is the load using asymmetric power, and supplying symmetric power to the load using symmetric power based on the power of the battery when the vehicle interior load is the load using symmetric power.

According to an embodiment, the supplying of asymmetric power may include supplying a positive (+) voltage and a zero voltage to the load using asymmetric power when the load using asymmetric power is connected to a positive (+) terminal and a neutral terminal of the discharging outlet.

According to an embodiment, the supplying of asymmetric power may include supplying a negative (−) voltage and a zero voltage to the load using asymmetric power when the load using asymmetric power is connected to a negative (−) terminal and the neutral terminal of the discharging outlet.

According to an embodiment, the supplying of symmetric power may include supplying a positive (+) voltage, a negative (−) voltage, and a zero voltage to the load using symmetrical power.

According to an embodiment, the method of operating a power conversion device for electric vehicles may include supplying a positive (+) voltage and a zero voltage to the vehicle exterior load and the load using asymmetric power when the vehicle exterior load is connected to the charging/discharging outlet and the load using asymmetric power is connected to the discharging outlet.

According to an embodiment, the method of operating a power conversion device for electric vehicles may include supplying a negative (−) voltage and a zero voltage to the vehicle exterior load and the load using asymmetric power when the vehicle exterior load is connected to the charging/discharging outlet and the load using asymmetric power is connected to the discharging outlet.

According to an embodiment, the method of operating a power conversion device for electric vehicles may include supplying a positive (+) voltage and a zero voltage to the vehicle exterior load and supplying a positive (+) voltage, a negative (−) voltage, and a zero voltage to the load using symmetric power when the vehicle exterior load is connected to the charging/discharging outlet and the load using symmetric power is connected to the discharging outlet.

Specific details according to various examples of embodiments of the present invention other than the means for solving the problems mentioned above are included in the description and drawings below.

BRIEF DESCRIPTION OF THE DRAWINGS

The above and other objects, features, and other advantages of embodiments of the present invention will be more clearly understood from the following detailed description taken in conjunction with the accompanying drawings, in which:

FIG. 7 is a diagram showing a power path in a case in which power is supplied to a vehicle interior load using the power conversion device for electric vehicles according to an embodiment of the present invention.

DETAILED DESCRIPTION OF ILLUSTRATIVE EMBODIMENTS

Figure 1:
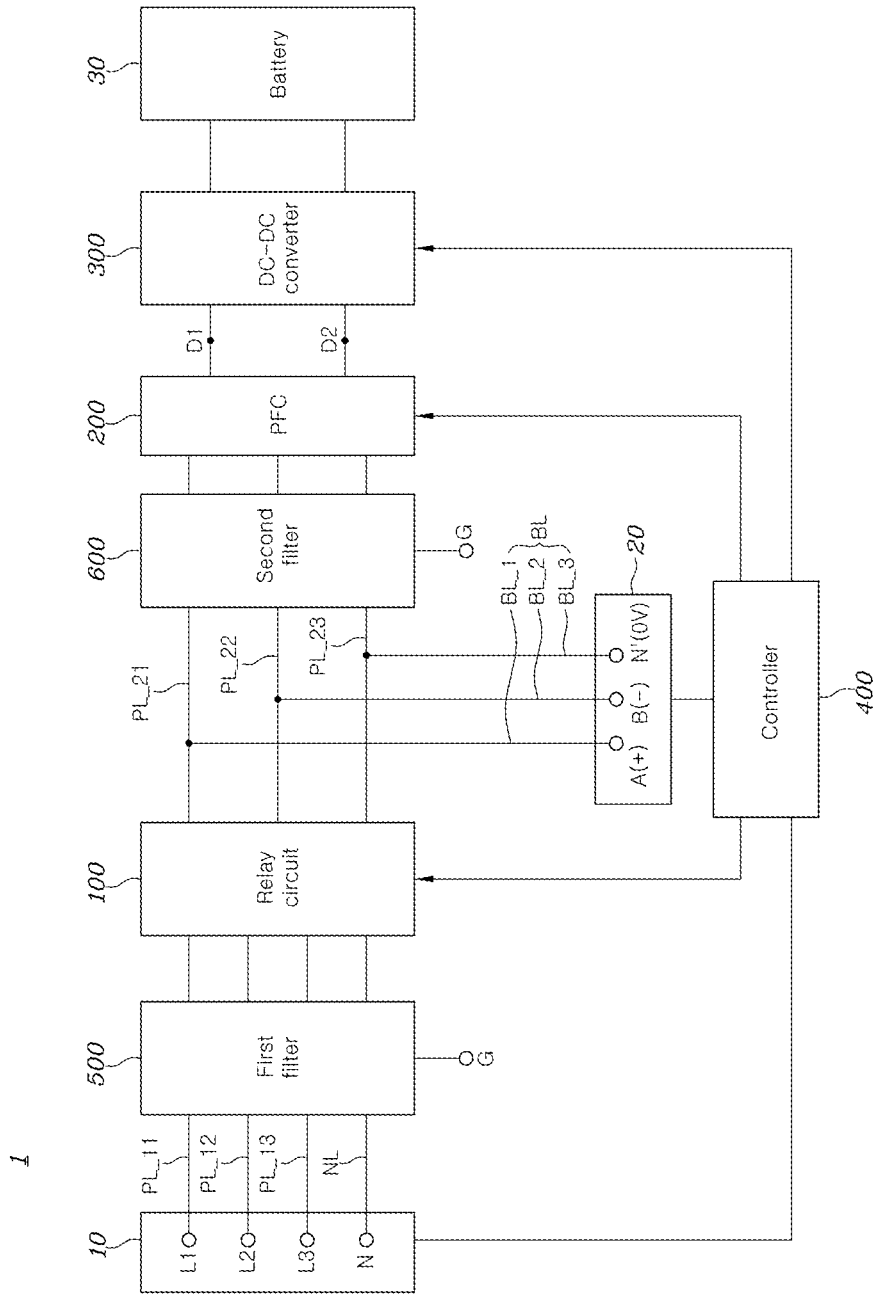
FIG. 1 is a diagram showing a configuration of a power conversion device for electric vehicles according to an embodiment of the present invention.

The advantages and features of embodiments of the present invention and the way of attaining the same will become apparent with reference to embodiments described below in detail in conjunction with the accompanying drawings. The present invention, however, is not limited to the embodiments disclosed hereinafter and may be embodied in many different forms. Rather, these exemplary embodiments are provided so that this disclosure will be thorough and complete and will fully convey the scope to those skilled in the art. Thus, the scope of the embodiments of the present invention should be defined by the claims.

The shapes, sizes, ratios, angles, numbers, and the like, which are illustrated in the drawings in order to describe various embodiments of the present invention, are merely given by way of example, and therefore, the embodiments of the present invention are not limited to the illustrations in the drawings. The same or extremely similar elements are designated by the same reference numerals throughout the specification. In addition, in the description of embodiments of the present invention, a detailed description of related known technologies will be omitted when it may make the subject matter of the embodiments of the present invention rather unclear. In the present specification, when the terms "comprise," "include," and the like are used, other elements may be added unless the term "only" is used. An element described in the singular form is intended to include a plurality of elements unless the context clearly indicates otherwise.

In the interpretation of constituent elements included in the various embodiments of the present invention, the constituent elements are interpreted as including an error range even if there is no explicit description thereof.

In the description of the various embodiments of the present invention, when describing temporal relationships, for example, when the temporal relationship between two actions is described using "after", "subsequently", "next", "before", or the like, the actions may not occur in succession unless the term "directly" or "just" is used.

In the description of the various embodiments of the present invention, although terms such as, for example, "first" and "second" may be used to describe various elements, these terms are merely used to distinguish the same or similar elements from each other. Therefore, in the present specification, an element modified by "first" may be the same as an element modified by "second" within the technical scope of the present invention unless mentioned otherwise.

It will be understood that, although the terms first, second, A, B, (a), (b), etc. may be used herein to describe various elements of embodiments of the present invention, these terms are only used to distinguish one element from another element and necessity, order, or sequence of corresponding elements are not limited by these terms. It will be understood that when one element is referred to as being "connected to", "coupled to", or "accessing" another element, one element may be "connected to", "coupled to", or "accessing" another element via a further element although one element may be directly connected to or may directly access another element.

"At least one" should be understood to include all combinations of one or more of associated elements. For example, "at least one of first, second, and third elements" means not only the first, second, or third element, but also all combinations of two or more of the first, second, and third elements.

The respective features of various embodiments of the present invention may be partially or wholly coupled to and combined with each other, and various technical linkage and driving thereof are possible. These various embodiments may be performed independently of each other or may be performed in association with each other.

Embodiments of the present invention will be described below through the accompanying drawings and examples. Since the scales of the components shown in the drawings have different scales from actual ones for convenience of description, the scales are not limited to the scales shown in the drawings.

Hereinafter, a power conversion device for electric vehicles and an operation method thereof according to embodiments of the present invention will be described with reference to the accompanying drawings.

FIG. 1 is a diagram showing a configuration of a power conversion device 1 for electric vehicles according to an embodiment of the present invention.

Referring to FIG. 1, the power conversion device 1 for electric vehicles according to an embodiment of the present invention may be a bidirectional on-board charger (OBC) mounted on an electric vehicle.

The power conversion device 1 for electric vehicles according to the embodiment may include a relay circuit 100, a power factor correction circuit (PFC) 200, a DC-DC converter 300, and a controller 400.

The relay circuit 100 may be connected to a charging/discharging outlet (or charging/discharging port or exterior V2L outlet) 10, may provide power supplied through the charging/discharging outlet 10 to the power factor correction circuit 200, and may provide power supplied from the power factor correction circuit 200 to the charging/discharging outlet 10.

The charging/discharging outlet 10 may support a battery charging mode and a battery discharging mode.

When an AC power source is connected to the charging/discharging outlet 10 (charging mode), the relay circuit 100 may provide power supplied from the AC power source to the power factor correction circuit 200. For example, the AC power source may be a single-phase AC power source or a three-phase AC power source.

When a load is connected to the charging/discharging outlet 10 (discharging mode), the relay circuit 100 may provide power supplied from the power factor correction circuit 200 to the charging/discharging outlet 10. A load located outside the electric vehicle may be connected to the charging/discharging outlet 10, and a load connected to the charging/discharging outlet 10 may be referred to as a "vehicle exterior load."

The charging/discharging outlet 10 may include a first terminal L1, a second terminal L2, a third terminal L3, and a neutral terminal N.

In the charging mode, an L1-phase AC voltage may be input to the first terminal L1, an L2-phase AC voltage may be input to the second terminal L2, and an L3-phase AC voltage may be input to the third terminal L3. In the discharging mode, a load may be connected to the first terminal L1 and the neutral terminal N.

The relay circuit 100 may be disposed between the charging/discharging outlet 10 and the power factor correction circuit 200 and may include a plurality of relays turned on/off in response to control of the controller 400.

The relay circuit 100 may transfer power supplied from the charging/discharging outlet 10 to the power factor correction circuit 200 and transfer power supplied from the power factor correction circuit 200 to the charging/discharging outlet 10.

The relay circuit 100 may be connected to the charging/discharging outlet 10 through a plurality of first power lines PL_11, PL_12, PL_13, and NL and may be connected to the power factor correction circuit 200 through a plurality of second power lines PL_21, PL_22, and PL_23.

Here, the plurality of first power lines may include the (1-1)-th power line PL_11 connected to the first terminal L1, the (1-2)-th power line PL_12 connected to the second terminal L2, the (1-3)-th power line PL_13 connected to the third terminal L3, and the neutral line NL connected to the neutral terminal N.

In addition, the plurality of second power lines may include the (2-1)-th power line PL_21, the (2-2)-th power line PL_22, and the (2-3)-th power line PL_23.

The power factor correction circuit 200 may be disposed between the relay circuit 100 and the DC-DC converter 300, may convert an AC voltage transmitted from the relay circuit 100 into a DC voltage, may output the DC voltage, and may simultaneously correct the power factor of the voltage.

That is, the power factor correction circuit 200 executes a rectification function of converting an AC voltage into a DC voltage and can increase a power factor by reducing a phase difference between the input current and the input voltage.

In addition, the power factor correction circuit 200 may supply the voltage provided from the DC-DC converter 300 to the relay circuit 100.

A discharging outlet (or discharging port) 20 may be connected between the relay circuit 100 and the power factor correction circuit 200 through a branch line BL.

For example, the discharging outlet (or interior V2L outlet) 20 may be provided in the inside of the electric vehicle, and a load connected to the discharging outlet 20 may be referred to as a "vehicle interior load."

The discharging outlet 20 may include a first terminal A, a second terminal B, and a neutral terminal N'. Here, the first terminal A may be a positive (+) terminal, and the second terminal B may be a negative (−) terminal.

The first terminal A may be connected to the (2-1)-th power line PL_21 through a first branch line BL_1, the second terminal B may be connected to the (2-2)-th power line PL_22 through a second branch line BL_2, and the neutral terminal N' may be connected to the (2-3)-th power line PL_23 through a third branch line BL_3.

That is, the first branch line BL_1 may connect the first terminal A and the (2-1)-th power line PL_21, the second branch line BL_2 may connect the second terminal B and the (2-2)-th power line PL_22, and the third branch line BL_3 may connect the neutral terminal N' and the (2-3)-th power line PL_23.

The DC-DC converter 300 is disposed between the power factor correction circuit 200 and the battery 30 and may convert the voltage provided from the power factor correction circuit 200 in response to control of the controller 400 and supply the converted voltage to the battery 30.

In addition, the DC-DC converter 300 may convert the voltage supplied from the battery 30 in response to control of the controller 400 and supply the converted voltage to the power factor correction circuit 200.

The controller 400 may allow the power conversion device 1 for electric vehicles to perform the battery charging mode in which the battery 30 is charged on the basis of an external AC power source and to perform the discharging mode in which the power of the battery 30 is output to the charging/discharging outlet 10 or the discharging outlet 20.

For example, a three-phase AC power source or a single-phase AC power source may be used as the external AC power source.

The battery discharging mode may include a first battery discharging mode in which power of the battery 30 is output to the charging/discharging outlet 10 and a second discharging mode in which power of the battery 30 is output to the discharging outlet 20.

When the AC power source is connected to the charging/discharging outlet 10, the controller 400 may control the relay circuit 100, the power factor correction circuit 200, and the DC-DC converter 300 such that the battery 30 is charged on the basis of the AC power source.

When a vehicle exterior load is connected to the charging/discharging outlet 10, the controller 400 may control the relay circuit 100, the power factor correction circuit 200, and the DC-DC converter 300 such that the power of the battery 30 is supplied to the vehicle exterior load connected to the charging/discharging outlet 10.

For example, the vehicle exterior load may be connected to the first terminal L1 and the neutral terminal N, but the embodiments of the present invention are not limited thereto.

When a vehicle interior load is connected to the discharging outlet 20, the controller 400 may control the relay circuit 100, the power factor correction circuit 200, and the DC-DC converter 300 such that the power of the battery 30 is supplied to the vehicle exterior load connected to the charging/discharging outlet 10.

For example, the vehicle interior load may be connected to the first terminal A and the neutral terminal N', may be connected to the second terminal B and the neutral terminal N', or may be connected to the first terminal A, the second terminal B, and the neutral terminal N'.

The vehicle interior load connected to the discharging outlet 20 may be a load using asymmetric power or a load using symmetric power.

A load using asymmetric power may be a load that operates by receiving a positive (+) voltage (e.g., +120 V) and 0 V, or it may be a load that operates by receiving a negative (−) voltage (e.g., −120 V) and 0 V. In addition, a load using symmetric power may be a load that operates by receiving a positive (+) voltage (e.g., +120 V), a negative (−) voltage (e.g., −120 V), and 0 V.

The controller 400 may control the relay circuit 100 and the power factor correction circuit 200 according to whether a load using asymmetric power or a load using symmetric power is connected to the discharging outlet 20.

According to an embodiment, the controller 400 may be implemented to detect whether a load is connected to the charging/discharging outlet 10 and the discharging outlet 20.

To this end, a cord connection detection sensor for each terminal may be provided in the charging/discharging outlet 10 and the discharging outlet 20. The detection sensor may output a detection signal to the controller 400 when a cord is connected to (or inserted into) a terminal.

Accordingly, the controller 400 can detect (or determine) whether loads are connected to the charging/discharging outlet 10 and the discharging outlet 20 based on a detection signal output from the detection sensor and can detect which terminals of the outputs 10 and 20 are connected to loads.

When a load using asymmetric power is connected to the discharging outlet 20, the controller 400 may control the relay circuit 100 and the power factor correction circuit 200 such that the asymmetric power is supplied to the load.

Further, when a load using symmetric power is connected to the discharging outlet 20, the controller 400 may control the relay circuit 100 and the power factor correction circuit 200 such that the symmetric power is supplied to the load.

According to an embodiment, a first filter 500 may be connected between the charging/discharging outlet 10 and the relay circuit 100, and a second filter 600 may be connected between the relay circuit 100 and the power factor correction circuit 200.

The first filter 500 can remove electrical noise included in the AC voltage transmitted from the charging/discharging outlet 10, and the second filter 600 can remove electrical noise included in the AC voltage transmitted from the relay circuit 100.

Figure 2:
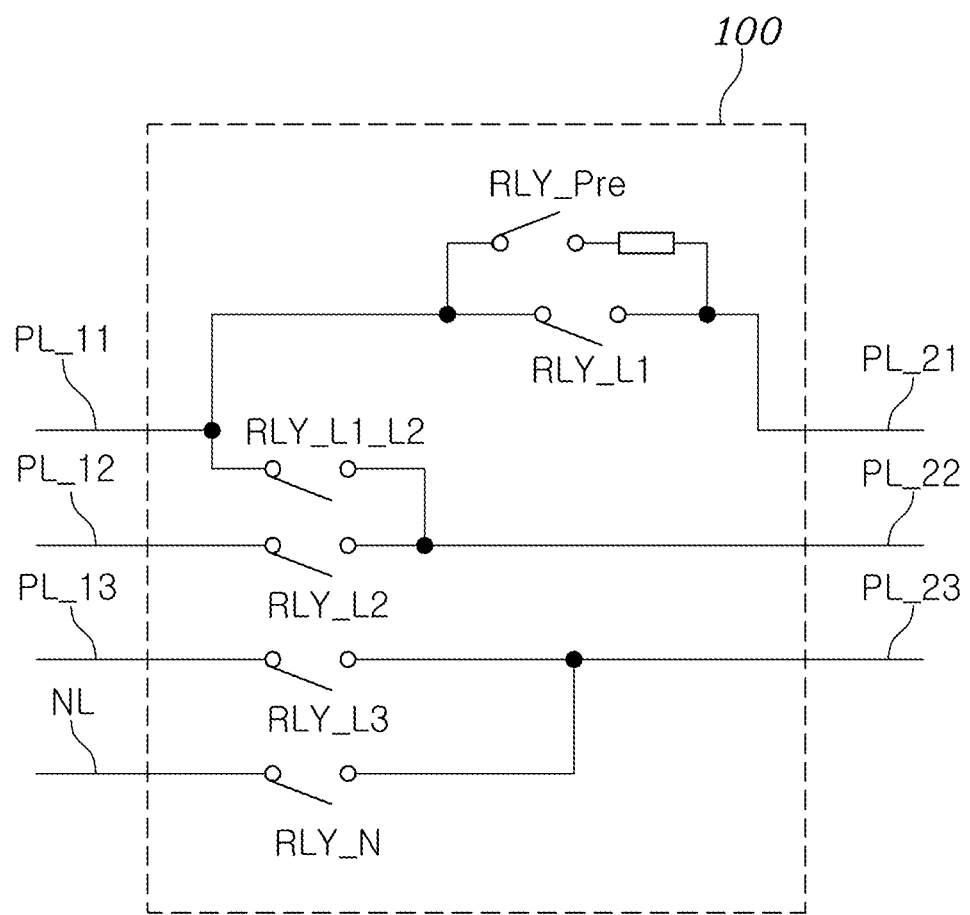
FIG. 2 is a diagram showing a configuration of a relay circuit according to an embodiment of the present invention.

FIG. 2 is a diagram showing a configuration of the relay circuit 100 according to an embodiment of the present invention.

Referring to FIGS. 1 and 2, the relay circuit 100 according to an embodiment of the present invention may include a precharge relay RLY_Pre, an L1 relay RLY_L1, an L1-L2 relay RLY_L1_L2, an L2 relay RLY_L2, an L3 relay RLY_L3, and a neutral point relay RLY_N, but the configuration of the relay circuit 100 is not limited thereto.

The precharge relay RLY_Pre, the L1 relay RLY_L1, the L1-L2 relay RLY_L1_L2, the L2 relay RLY_L2, the L3 relay RLY_L3, and the neutral point relay RLY_N may be controlled by the controller 400.

The precharge relay RLY_Pre may be connected in series between the (1-1)-th power line PL_11 connected to the first terminal L1 and the (2-1)-th power line PL_21, and the L1 relay RLY_L1 may be connected in series between the (1-1)-th power line PL_11 connected to the first terminal L1 and the (2-1)-th power line PL_21.

Accordingly, the precharge relay RLY_Pre and the L1 relay RLY_L1 may be connected in parallel between the (1-1)-th power line PL_11 and the (2-1)-th power line PL_21.

The L1-L2 relay RLY_L1_L2 may be connected in series between the (1-1)-th power line PL_11 and the (2-2)-th power line PL_22, and the L2 relay RLY_L2 may be connected in series between the (1-2)-th power line PL_12 and the (2-2)-th power line PL_22.

In this manner, one end of the L1-L2 relay RLY_L1_L2 may be connected to the (1-1)-th power line PL_11, one end of the L2 relay RLY_L2 may be connected to the (1-2)-th power line PL_12, and the other end of the relay RLY_L1_L2 and the other end of the L2 relay RLY_L2 may be connected in common to the (2-2)-th power line PL_22.

Accordingly, the L1-L2 relay RLY_L1_L2 and the L2 relay RLY_2 may be connected in parallel to the (2-2)-th power line PL_22.

The L3 relay RLY_L3 may be connected in series between the (1-3)-th power line PL_13 and the (2-3)-th power line PL_23, and the neutral point relay RLY_N may be connected between the neutral line NL and the (2-3)-th power line PL_23.

One end of the L3 relay RLY_L3 may be connected to the (1-3)-th power line PL_13, one end of the neutral point relay RLY_N may be connected to the neutral line NL, and the other end of the L3 relay RLY_L3 and the other end of the neutral point relay RLY_N may be commonly connected to the (2-3)-th power line PL_23.

Accordingly, the L3 relay RLY_L3 and the neutral point relay RLY_N may be connected in parallel to the (2-3)-th power line PL_23.

Figure 3:
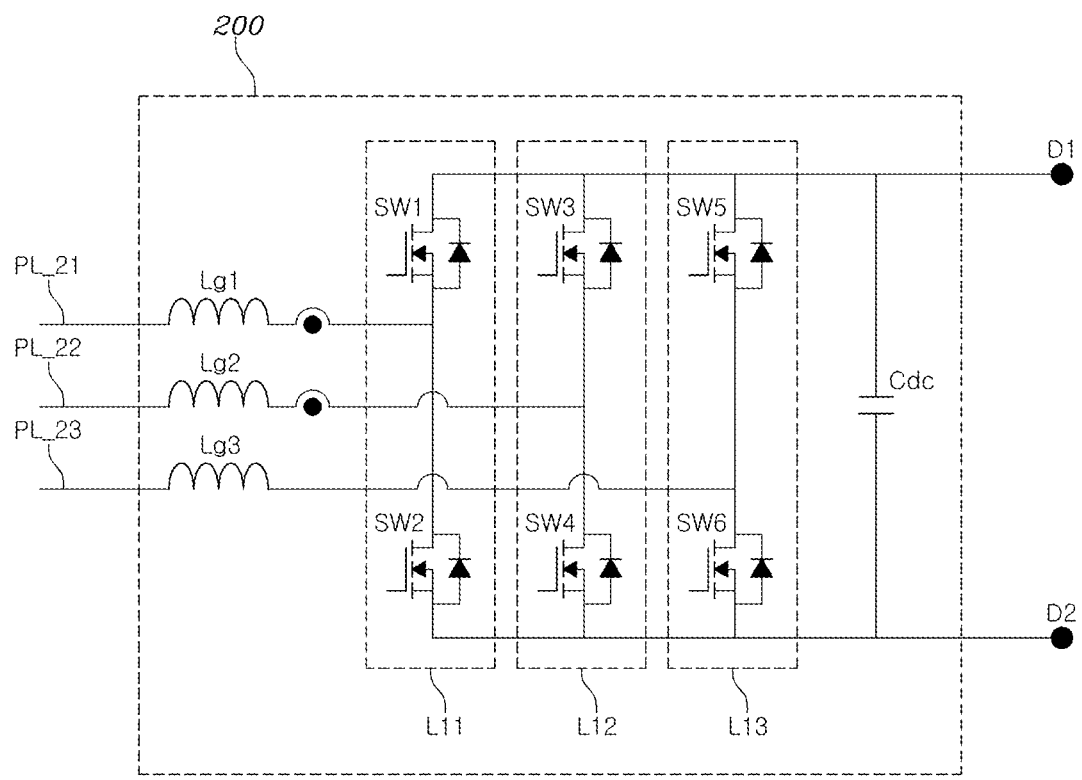
FIG. 3 is a diagram showing a configuration of a power factor correction circuit according to an embodiment of the present invention.

FIG. 3 is a diagram showing a configuration of the power factor correction circuit 200 according to an embodiment of the present invention.

Referring to FIGS. 1 to 3, the power factor correction circuit 200 according to an embodiment of the present invention may include first to third input inductors Lg1, Lg2, and Lg3, a DC capacitor Cdc, and first to third legs L11, L12, and L13, but the configuration of the power factor correction circuit 200 is not limited thereto.

One end of the first input inductor Lg1 may be connected to the (2-1)-th power line PL_21, and the other end of the first input inductor Lg1 may be connected to the first leg L11. One end of the second input inductor Lg2 may be connected to the (2-2)-th power line PL_22, and the other end of the second input inductor Lg2 may be connected to the second leg L12. One end of the third input inductor Lg3 may be connected to the (2-3)-th power line PL_23, and the other end of the third input inductor Lg3 may be connected to the third leg L13.

The DC capacitor Cdc may be connected in parallel between a first DC link D1 and a second DC link D2. The DC capacitor Cdc may be connected in parallel to the first to third legs L11, L12, and L13.

The first leg L11 may include two switch elements SW1 and SW2 connected in series between the first DC link D1 and the second DC link D2 and may be connected to the (2-1)-th power line PL_21 through the first input inductor Lg1.

The second leg L12 may include two switch elements SW3 and SW4 connected in series between the first DC link D1 and the second DC link D2 and may be connected to the (2-2)-th power line PL_22 through the second input inductor Lg2.

The third leg L13 may include two switch elements SW5 and SW6 connected in series between the first DC link D1 and the second DC link D2 and may be connected to the (2-3)-th power line PL_23 through the third input inductor Lg3.

The other end of the first input inductor Lg1 may be connected between the first switch element SW1 and the second switch element SW2. The other end of the second input inductor Lg2 may be connected between the third switch element SW3 and the fourth switch element SW4. The other end of the third input inductor Lg3 may be connected between the fifth switch element SW5 and the sixth switch element SW6.

The first to sixth switch elements SW1 to SW6 of the power factor correction circuit 200 may be controlled by the controller 400.

Figure 4:
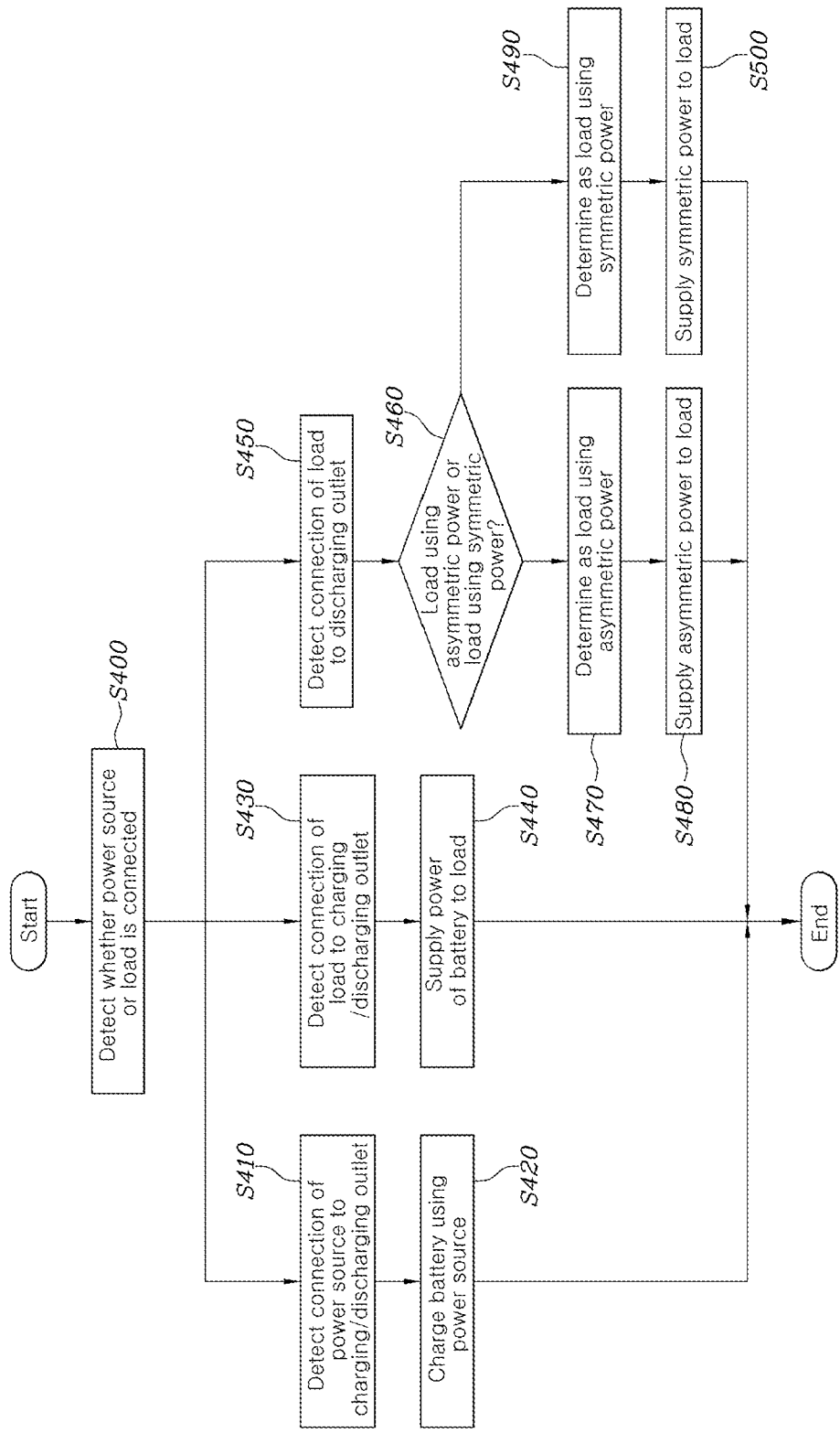
FIG. 4 is a diagram for describing the operation of the power conversion device for electric vehicles according to an embodiment of the present invention.
Figure 5:
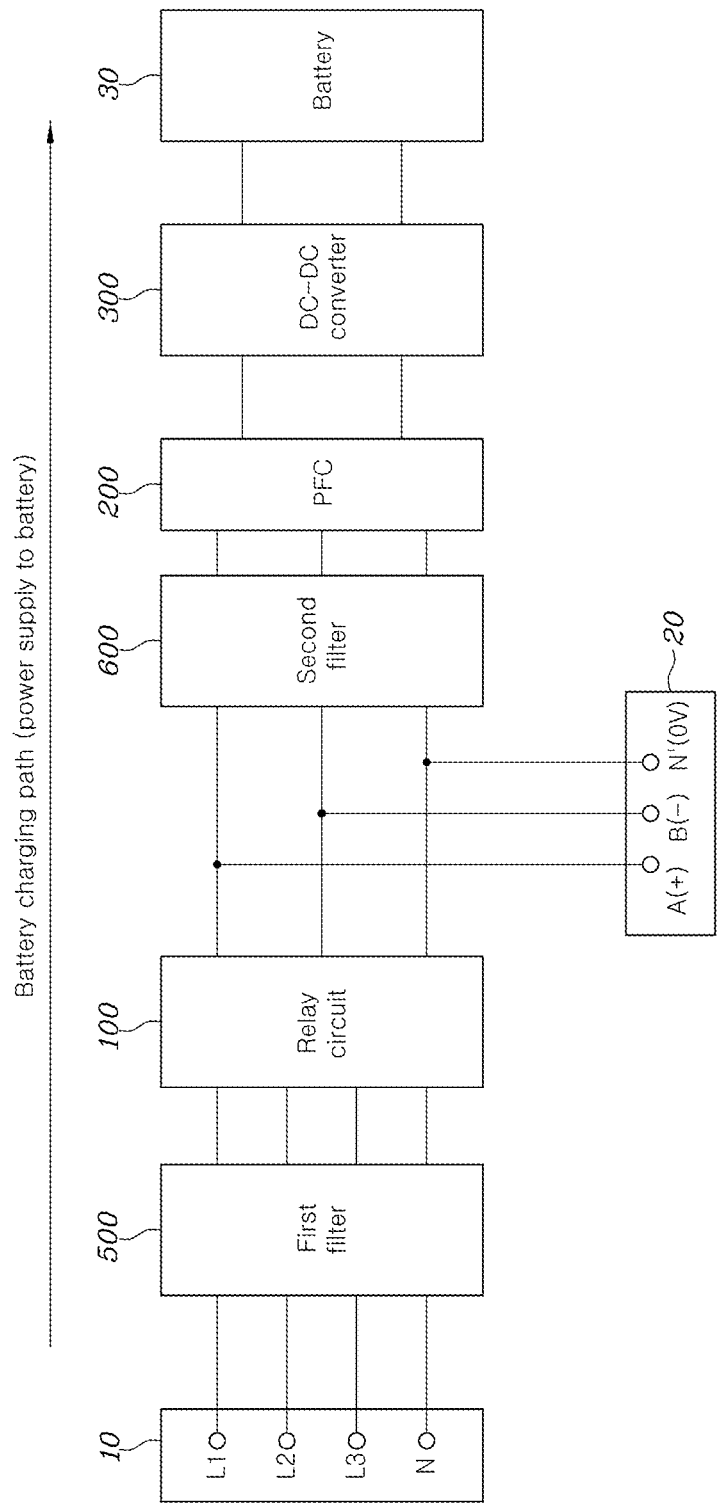
FIG. 5 is a diagram showing a power path in a case in which a battery is charged using the power conversion device for electric vehicles according to an embodiment of the present invention.
Figure 6:
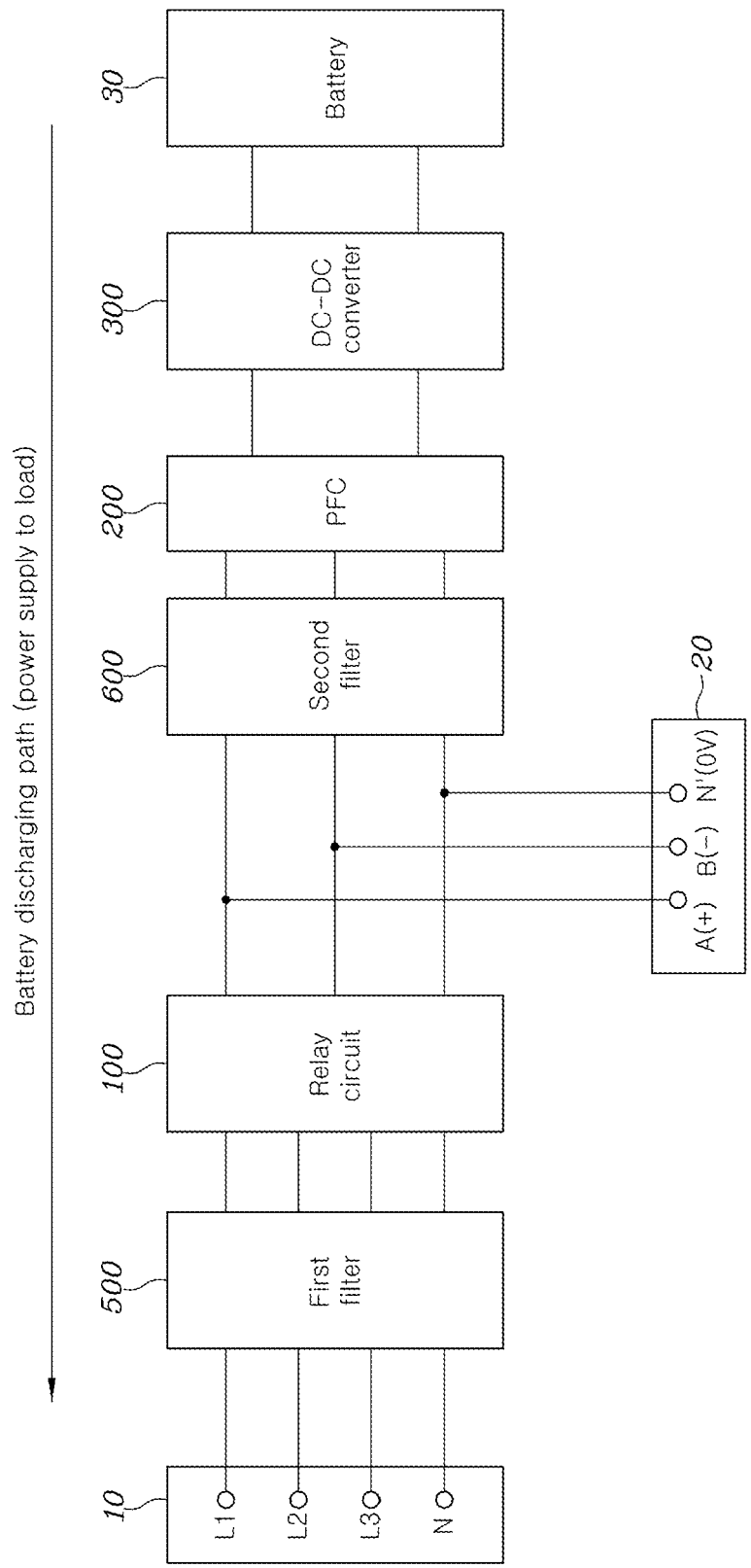
FIG. 6 is a diagram showing a power path in a case in which power is supplied to a vehicle exterior load using the power conversion device for electric vehicles according to an embodiment of the present invention.

FIG. 4 is a diagram for describing the operation of the power conversion device for electric vehicles according to an embodiment of the present invention. FIG. 5 is a diagram showing a power path in a case in which the battery 30 is charged using the power conversion device for electric vehicles according to an embodiment of the present invention. FIG. 6 is a diagram showing a power path in a case in which power is supplied to a vehicle exterior load using the power conversion device for electric vehicles according to an embodiment of the present invention. FIG. 7 is a diagram showing a power path in a case in which power is supplied to a vehicle interior load using the power conversion device for electric vehicles according to an embodiment of the present invention.

The step-by-step operation shown in FIG. 4 may be performed in the power conversion device 1 for electric vehicles described with reference to FIGS. 1 to 3.

The operation of the power conversion device 1 for electric vehicles will be described with reference to FIGS. 1 to 7, focusing on control of the controller 400.

First, the controller 400 may detect whether power or a load is connected to the charging/discharging outlet 10 and the discharging outlet 20 (S400).

In step S400, the controller 400 may detect whether a power source or a load is connected to the charging/discharging outlet 10 and the discharging outlet 20 on the basis of detection signals from a cord connection detection sensor for each terminal provided in the charging/discharging outlet 10 and the discharging outlet 20.

When the controller 400 detects that a power source is connected to the charging/discharging outlet 10 (S410), the battery 30 can be charged based on the power source connected to the charging/discharging outlet 10, as shown in FIG. 5 (S420).

For example, the power source connected to the charging/discharging outlet 10 may be a three-phase AC power source or a single-phase AC power source.

Control of charging the battery 30 using an external AC power source through a power conversion device may be performed by various methods known in the art.

For example, the controller 400 may turn on the L1 relay RLY_L1, the L2 relay RLY_L2, and the L3 relay RLY_L3 and may control (or switch) the first leg L11, the second leg L12, and the third leg L13 of the power factor correction circuit 200 such that the battery 30 is charged based on a three-phase AC voltage.

When the controller 400 detects that a load ("vehicle exterior load") is connected to the charging/discharging outlet 10 (S430), the power of the battery 30 can be supplied to the load connected to the charging/discharging outlet 10, as shown in FIG. 6 (S440).

In step S440, the controller 400 may turn on the L1 relay RLY_L1, the L1-L2 relay RLY_L1_L2, and the neutral point relay RLY_N and turn off the L2 relay RLY_L2 and the L3 relay RLY_L3.

Accordingly, the (1-1)-th power line PL_11 and the (2-1)-th power line PL_21 can be connected, and the neutral line NL and the (2-3)-th power line PL_23 can be connected. According to this connection relationship, the first terminal L1 of the charging/discharging outlet 10 and the first leg L11 of the power factor correction circuit 200 can be connected, and the neutral terminal N of the charging/discharging outlet 10 and the third leg L13 of the power factor correction circuit 200 can be connected.

In this way, the controller 400 can control (or switch) the first leg L11 and the third leg L13 of the power factor correction circuit 200 such that the power of the battery 30 is output to the charging/discharging outlet 10 in a state in which the charging/discharging outlet 10 and the power factor correction circuit 200 are connected according to the operation of the relay circuit 100.

Here, the controller 400 may perform single-phase totem-pole control on the first leg L11 and the third leg L13.

Since the first branch line BL_1 is connected to the (2-1)-th power line PL_21 and the third branch line BL_3 is connected to the (2-3)-th power line PL_23, if a load is connected to the first terminal A and the neutral terminal N' of the discharging outlet 20, the power of the battery 30 may also be supplied to the load.

That is, when the L1 relay RLY_L1, the L1-L2 relay RLY_L1_L2, and the neutral point relay RLY_N are turned on and the L2 relay RLY_L2 and the L3 relay RLY_L3 are turned off, the power of the battery 30 can be supplied to a load connected to the charging/discharging outlet 10 and a load connected to the first terminal A and the neutral terminal N' of the discharging outlet 20.

When the controller 400 detects that a load ("vehicle interior load") is connected to the discharging outlet 20 (S450), the power of the battery 30 can be supplied to the load connected to the discharging outlet 20, as shown in FIG. 7.

Here, the controller 400 may determine whether the load connected to the discharging outlet 20 is a load using asymmetric power or a load using symmetric power (S460).

In step S460, the controller 400 may determine whether the load is connected to the first terminal A and the neutral terminal N', whether the load is connected to the second terminal B and the neutral terminal N', or whether the load is connected to the first terminal A, the second terminal B, and the neutral terminal N'.

Here, when the load is connected to the first terminal A and the neutral terminal N' of the discharging outlet 20 or connected to the second terminal B and the neutral terminal N' of the discharging outlet 20, the controller 400 can determine that the load connected to the discharging outlet 20 is a load using asymmetric power.

The controller 400 may determine that the load connected to the discharging outlet 20 is a load using symmetric power when the load is connected to the first terminal A, the second terminal B, and the neutral terminal N'.

Upon determining that the load is a load using asymmetric power (S470), the controller 400 may control the relay circuit 100 and the power factor correction circuit 200 such that asymmetric power is supplied to the load (S480).

In step S480, the controller 400 may turn off all of the L1 relay RLY_L1, the L1-L2 relay RLY_L1_L2, the L2 relay RLY_L2, the L3 relay RLY_L3, and the neutral point relay RLY_N.

Accordingly, the power from the battery 30 is cut off by the relay circuit 100 and thus is not supplied to the charging/discharging outlet 10, and the power from the battery 30 can be supplied to the discharging outlet 20 through the branch lines BL_1, BL_2, and BL_3 connected to the second power lines PL_21, PL_22, and PL_23.

Accordingly, the power of the battery 30 can be supplied to a load connected to the discharging outlet 20, and a load using asymmetric power or a load using symmetric power may be used as the load.

A load using asymmetric power may be connected to the first terminal A (+ terminal) and the neutral terminal N' of the discharging outlet 20 or may be connected to the second terminal B (− terminal) and the neutral terminal N' of the discharging outlet 20.

A load using symmetric power may be connected to the first terminal A (+ terminal), the second terminal B (− terminal), and the neutral terminal N' of the discharging outlet 20.

The controller 400 may perform single-phase totem-pole control on the first to third legs L11, L12, and L13 of the power factor correction circuit 200 in a case in which a load using asymmetric power is connected to the discharging outlet 20. In addition, the controller 400 may perform three-phase pulse width modulation (PWM) control on the first to third legs L11, L12, and L13 of the power factor correction circuit 200 in a case in which a load using symmetric power is connected to the discharging outlet 20.

Upon determining that the load is a load using symmetric power (S490), the controller 400 may control the relay circuit 100 and the power factor correction circuit 200 such that symmetric power is supplied to the load (S500).

In step S500, the controller 400 may turn off the L1 relay RLY_L1, the L1-L2 relay RLY_L1_L2, the L2 relay RLY_2, the L3 relay RLY_3, and the neutral point relay RLY_N.

Then, the controller 400 may perform PWM control on the first to third legs L11, L12, and L13 such that a positive (+) voltage is supplied to the (2-1)-th power line PL_21, a negative (−) voltage is supplied to the (2-2)-th power line PL_22, and 0 V is supplied to the (2-3)-th power line PL_23.

Accordingly, the positive (+) voltage, negative (−) voltage, and 0 V can be supplied to the terminals A, B, and N' of the discharging outlet 20 through the branch lines BL_1, BL_2, and BL_3 connected to the second power lines PL_21, PL_22, and PL_23.

In step S500, the controller 400 may turn on the L1 relay RLY_L1 and the neutral point relay RLY_N and turn off the L1-L2 relay RLY_L1_L2, the L2 relay RLY_2, and the L3 relay RLY_3.

Then, the controller 400 may perform PWM control on the first to third legs L11, L12, and L13 such that a positive (+) voltage is supplied to the (2-1)-th power line PL_21, a negative (−) voltage is supplied to the (2-2)-th power line PL_22, and 0 V is supplied to the (2-3)-th power line RLY_23.

As the L1 relay RLY_L1 and the neutral point relay RLY_N are turned on, the positive (+) voltage can be supplied to the L1 terminal L1 of the charging/discharging outlet 10 and 0 V can be supplied to the neutral terminal N of the charging/discharging outlet 10.

Accordingly, when a vehicle exterior load is connected to the L1 terminal L1 and the neutral terminal N of the charging/discharging outlet 10, the power from the battery 30 can be supplied to the vehicle exterior load.

Therefore, power can be simultaneously supplied to a load using symmetric power connected to the discharging outlet 20 and a vehicle exterior load connected to the charging/discharging outlet 10.

According to the power conversion device 1 for electric vehicles and the operation method thereof according to an embodiment of the present invention, the power conversion device 1 for electric vehicles can provide a positive (+) voltage and a zero voltage to a load using asymmetric power in a case in which the load using asymmetric power is connected to the positive (+) terminal and the neutral terminal of the discharging outlet 20.

According to an embodiment of the present invention, the power conversion device 1 for electric vehicles can provide a negative (−) voltage and the zero voltage to a load using asymmetric power in a case in which the load using asymmetric power is connected to the negative (−) terminal and the neutral terminal of the discharging outlet 20.

According to an embodiment of the present invention, the power conversion device 1 for electric vehicles can provide the positive (+) voltage, the negative (−) voltage, and the zero voltage to a load using symmetric power.

According to an embodiment of the present invention, the power conversion device 1 for electric vehicles can provide the positive (+) voltage and the zero voltage to a vehicle exterior load and a load using asymmetric power in a case in which the vehicle exterior load is connected to the charging/discharging outlet 10 and the load using asymmetric power is connected to the discharging outlet 20.

According to an embodiment of the present invention, the power conversion device 1 for electric vehicles can provide the negative (−) voltage and the zero voltage to a vehicle exterior load and a load using asymmetric power in a case in which the vehicle exterior load is connected to the charging/discharging outlet 10 and the load using asymmetric power is connected to the discharging outlet 20.

According to an embodiment of the present invention, the power conversion device 1 for electric vehicles can provide the positive (+) voltage and the zero voltage to a vehicle exterior load and can provide the positive (+) voltage, the negative (−) voltage, and the zero voltage to a load using symmetric power in a case in which the vehicle exterior load is connected to the charging/discharging outlet 10 and the load using symmetric power is connected to the discharging outlet 20.

The power conversion device 1 for electric vehicles according to an embodiment of the present invention described above can supply power to various types of loads, such as a vehicle exterior load, a vehicle interior load using asymmetric power, and a vehicle interior load using symmetric power.

Therefore, the power conversion device 1 for electric vehicles according to an embodiment of the present invention can be applied to symmetric power outlets and asymmetric power outlets and can be applied to vehicles regardless of the type of power required for each country. In addition, since power supply of the power conversion device 1 for electric vehicles according to an embodiment of the present invention can be realized using a relay circuit and a power factor correction circuit, objects of embodiments of the present invention can be achieved using a minimum number of electrical components.

According to an embodiment of the present invention, it is possible to provide a power conversion device for electric vehicles capable of supplying power to loads using different types of power and an operation method thereof.

In addition, according to an embodiment of the present invention, it is possible to provide a power conversion device for electric vehicles capable of realizing power conversion for supplying power to symmetric power outlets and asymmetric power outlets for each country using a minimum number of electrical components and an operation method thereof.

By using the power conversion device for electric vehicles and the operation method thereof according to an embodiment of the present invention, power can be supplied to a symmetric power outlet and an asymmetric power outlet using one power conversion device, and power can be supplied to loads using different types of power.

The effects of embodiments of the present invention are not limited to the effects mentioned above, and other effects not mentioned will be clearly understood by those skilled in the art from the description herein.

Since the content of the problem to be solved, the means for solving the problem, and the effect mentioned above do not specify essential features of the claims, the scope of the claims is not limited by the matters described in the content of the specification.

Although the embodiments of the present invention have been described in more detail with reference to the accompanying drawings, the embodiments of the present invention are not necessarily limited to these embodiments and may be variously modified and implemented without departing from the technical spirit of the present invention. Therefore, the embodiments disclosed in this specification are not intended to limit the technical spirit of the present invention, but to explain, and the scope of the technical spirit of the present invention is not limited by these embodiments. Therefore, it should be understood that the embodiments described above are illustrative in all respects and not restrictive. The protection scope of the embodiments of the present invention should be construed according to the claims, and all technical ideas within the equivalent range should be construed as being included in the scope of the embodiments of the present invention.

What is claimed is:

1. A power conversion device comprising:
   a battery;
   a relay circuit connected to a charging/discharging outlet through a plurality of first power lines;
   a power factor correction circuit connected to the relay circuit through a plurality of second power lines between the relay circuit and the battery;
   a discharging outlet connected to branch lines branched from each of the second power lines; and
   a controller configured to control the relay circuit and the power factor correction circuit such that power from the battery is suppliable to a load configured to use asymmetric power or to a load configured to use symmetric power via the discharging outlet,
   wherein the branch lines comprise first to third branch lines respectively connected to the plurality of second power lines, and
   wherein the discharging outlet comprises a positive (+) terminal connected to the first branch line, a negative (−) terminal connected to the second branch line, and a neutral terminal connected to the third branch line.

2. The device of claim 1, wherein a positive (+) voltage is suppliable to a first power line of the plurality of second power lines, a negative (−) voltage is suppliable to a second power line of the plurality of second power lines, and a zero voltage is suppliable to a third power line of the plurality of second power lines.

3. The device of claim 1, wherein the load configured to use asymmetric power is connected to the positive (+) terminal and the neutral terminal.

4. The device of claim 1, wherein the load configured to use asymmetric power is connected to the negative (−) terminal and the neutral terminal.

5. The device of claim 1, wherein the load configured to use symmetric power is connected to the positive (+) terminal, the negative (−) terminal, and the neutral terminal.

6. The device of claim 1, wherein:
   wherein the relay circuit comprises:
      an L1 relay connected to a first power line of the plurality of second power lines;
      an L1-L2 relay and an L2 relay connected in parallel to a second power line of the plurality of second power lines; and
      an L3 relay and a neutral point relay connected in parallel to a third power line of the plurality of second power lines, and
   wherein the power factor correction circuit comprises:
      a first leg connected to the first power line;
      a second leg connected to the second power line; and
      a third leg connected to the third power line.

7. The device of claim 6, wherein, in a case in which the load configured to use asymmetric power is connected to the discharging outlet, the controller is configured to:
   turn off the L1 relay, the L1-L2 relay, the L2 relay, the L3 relay, and the neutral point relay; and
   control the first to third legs such that a positive (+) voltage is suppliable to the first power line or a negative (−) voltage is suppliable to the second power line.

8. The device of claim 6, wherein, in a case in which the load configured to use asymmetric power is connected to the discharging outlet, the controller is configured to:
turn on the L1 relay, the L1-L2 relay, and the neutral point relay;
   turn off the L2 relay and the L3 relay; and
   control the first to third legs such that a positive (+) voltage is suppliable to the first power line or a negative (−) voltage is suppliable to the second power line.

9. The device of claim 8,
   wherein the charging/discharging outlet comprises an L1 terminal connected to the L1 relay and the L1-L2 relay through a first power line of the plurality of first power lines and a second neutral terminal connected to the neutral point relay through a second power line of the plurality of first power lines, and
   wherein, in a case in which a vehicle exterior load is connected to the L1 terminal and the second neutral terminal, the positive (+) voltage suppliable to the first power line of the plurality of second power lines is suppliable to the L1 terminal or the negative (−) voltage suppliable to the second power line of the plurality of second power lines is suppliable to the L1 terminal such that power is simultaneously suppliable to the load configured to use asymmetric power and the vehicle exterior load.

10. The device of claim 6, wherein, in a case in which the load configured to use symmetric power is connected to the discharging outlet, the controller is configured to:
   turn off the L1 relay, the L1-L2 relay, the L2 relay, the L3 relay, and the neutral point relay; and
   perform pulse width modulation control on the first to third legs such that a positive (+) voltage is suppliable to the first power line of the plurality of second power lines, a negative (−) voltage is suppliable to the second power line of the plurality of second power lines, and a zero voltage is suppliable to the third power line of the plurality of second power lines.

11. The device of claim 6, wherein, in a case in which the load configured to use symmetric power is connected to the discharging outlet, the controller is configured to:
   turn on the L1 relay and the neutral point relay;
   turn off the L1-L2 relay, the L2 relay, and the L3 relay; and
   perform pulse width modulation control on the first to third legs such that a positive (+) voltage is suppliable to the first power line of the plurality of second power lines, a negative (−) voltage is suppliable to the second power line of the plurality of second power lines, and a zero voltage is suppliable to the third power line of the plurality of second power lines.

12. The device of claim 11,
   wherein the charging/discharging outlet comprises an L1 terminal connected to the L1 relay and the L1-L2 relay through a first power line of the plurality of first power lines and a second neutral terminal connected to the neutral point relay through a second power line of the plurality of first power lines, and
   in a case in which a vehicle exterior load is connected to the L1 terminal and the second neutral terminal, the positive (+) voltage suppliable to the first power line of the plurality of second power lines is suppliable to the L1 terminal and the zero voltage suppliable to the third power line of the plurality of second power lines is suppliable to the second neutral terminal, such that power is simultaneously suppliable to the load configured to use symmetric power and the vehicle exterior load.

13. A vehicle comprising:
the device of claim 1,
wherein the vehicle is an electrical vehicle.

\* \* \* \* \*